Sept. 23, 1941.    W. A. JOHNSON    2,256,562
HARVESTER AND FEEDER
Filed July 22, 1938
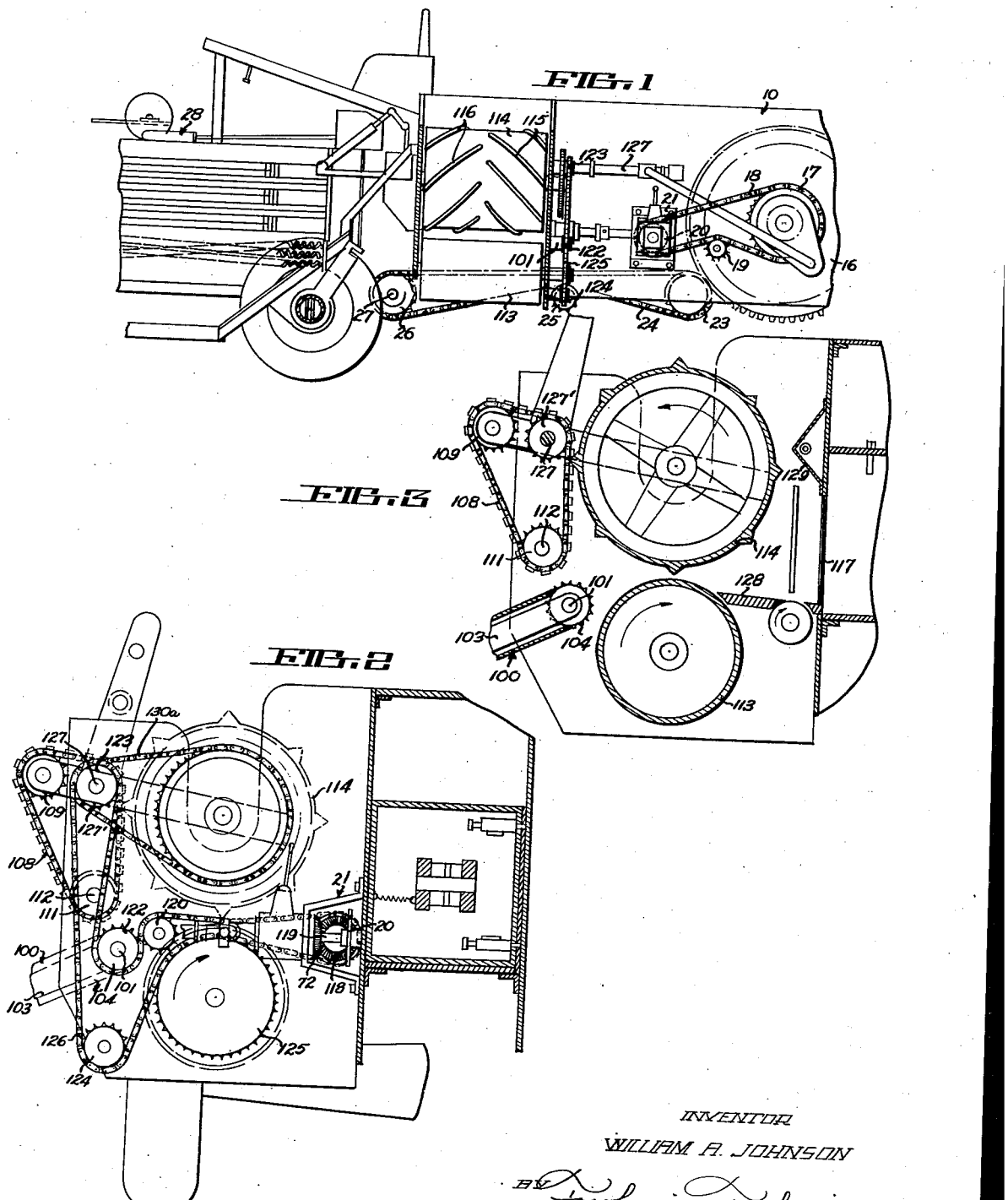
INVENTOR
WILLIAM A. JOHNSON
ATTORNEYS Patented Sept. 23, 1941

2,256,562

UNITED STATES PATENT OFFICE 2,256,562

HARVESTER AND FEEDER

William A. Johnson, Springfield, Ill., assignor, by mesne assignments, to The Ohio Cultivator Company Application July 22, 1938, Serial No. 220,621

2 Claims. (Cl. 214—17)

The present application relates to a harvester and feeder, and more particularly to a feeding means intended to be applied to, and used in connection with a vehicle for carrying or operating upon the material to be harvested. Specifically, my invention is disclosed in association with a transit hay baler, and it is the primary object of the invention to provide means, associable with and operating in conjunction with a transit hay baler, for rapidly and effectively delivering the crop to the baling chamber of the machine with which the harvester and feeder are associated. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a side elevation of a hay baler with which the harvester and feeder may be associated, part of the feeding mechanism being shown is integrated with the baler;

Fig. 2 is an enlarged fragmentary view of the feeder, the latter being shown in some detail;

Fig. 3 is a sectional view of the feeding mechanism, taken upon a plane parallel with, but spaced rearwardly from, the plane of Fig. 2.

Referring more particularly to the drawing, it will be seen in Fig. 1 that I have illustrated a hay baler or other vehicle, indicated generally by the reference numeral 10, and carrying a prime mover (not shown), which is connected through suitable belting or gearing to a pair of bull wheels 16, of which only one has been shown.

The shaft of the bull wheel 16 carries a sprocket 17 which, through a chain 18 running over a tensioning idler 19, drives a sprocket 20 (see Fig. 2) of a transmission 21. The bull wheel 16 meshes with a gear (not shown) connected to drive a sprocket 23 which, through a chain 24 running over a tensioning idler 25, drives the sprocket 26 on a shaft 27.

The harvesting mechanism, which may be of any suitable type, is indicated generally by the reference numeral 28 in Figure 1. This harvester includes a shear plate, a transversely reciprocable cutter arm and a gathering reel.

The material cut by the cutter bar is being deposited on a conveyor (not shown) by the gathering reel.

This material is delivered from the conveyor onto a conveyor carried by the vehicle, and indicated generally by the reference numeral 100. It comprises a shaft 101 journalled in suitable supports on the vehicle, and a companion shaft (not shown) carried by links 103 adjustable about the axis of the shaft 101. Sprockets 104 on the shaft 101 and sprockets on the companion shaft carry two parallel endless bands (not shown) to which is secured a plurality of flexible aprons (not shown) preferably made of canvas or the like, said aprons being secured to the bands at their leading transverse edges and being free at their trailing transverse edges, the trailing transverse edge of each apron overlapping the leading transverse edge of the next succeeding apron. This particular structure has been found to be extremely efficient in the handling of straw, hay, alfalfa, and the like.

A further conveyor 108 cooperates with the conveyor 100 adjacent the discharge end thereof, said conveyor being threaded over idler sprockets 109 and 111, respectively carried by shafts 110 and 112 and over a sprocket 127' carried upon a shaft 127 later to be described. Material is fed, by the conveyors 100 and 108, between a drum 113 and a drum 114. The drum 114 is mounted, as is clearly shown in Figs. 2 and 3, for floating movement about the axis of the shaft 127; and said drum is formed with a plurality of ribs on its peripheral surface. The ribs 115 of one series extend from the right-hand end of the drum rearwardly, as considered in connection with the direction of rotation of the drum, toward the median plane between the opposite ends of the drum. Similarly, the ribs 116 of the other series extend from the left-hand end of the drum rearwardly toward the median plane between the ends of the drum. Preferably, the ribs of one series are staggered peripherally with respect to the ribs of the other series.

The cooperative effect of the drums 113 and 114 is to force the material being handled to move across the table 128 to and through the inlet port 117 into the baling chamber of the illustrated machine; the material being guided in such movement by a shield 129 as shown in Fig. 3.

The transmission 21 includes a gear 118 meshing with the beveled gear 72 (Figure 2), and carried upon a shaft 119 (see Fig. 1) which carries a sprocket 120. As is illustrated in Fig. 2, a chain 126 leads around the sprocket 120, under sprocket 122, on shaft 101, over sprocket 123 on shaft 127, under sprocket 124, and over sprocket 125 which is connected to the drum 113. The shaft 127 likewise carries a further sprocket 130 which, through chain 130a, drives sprocket 129 carried by the drum 114.

I claim as my invention:

1. In a machine of the class described, a chamber having an inlet port, a drum mounted adjacent said port, and means for driving said drum to urge material to and through said port, said drum being provided on its peripheral surface with two series of ribs, one series adjacent each end of the drum, each rib of each series extending from a point adjacent an end of the drum rearwardly, with respect to the direction of rotation of the drum, toward the median plane between the ends of the drum.

2. In a machine of the class described, a chamber having an inlet port, a drum mounted adjacent said port, and means for driving said drum to urge material to and through said port, said drum being provided on its peripheral surface with two series of ribs, one series adjacent each end of the drum, each rib of each series extending from a point adjacent an end of the drum rearwardly, with respect to the direction of rotation of the drum, toward the median plane between the ends of the drum, and the ribs of one series being peripherally staggered with respect to the ribs of the other series.

WILLIAM A. JOHNSON.